(12) United States Patent
Wilhelmi

(10) Patent No.: US 6,698,971 B1
(45) Date of Patent: Mar. 2, 2004

(54) WOOD CONNECTOR OF SHEET METAL

(75) Inventor: Jurgen H. Wilhelmi, Syke-Wachendorf (DE)

(73) Assignee: Simpson Strong-Tie Company, Inc., Dublin, CA (US)

( * ) Notice: Subject to any disclaimer, the term of this patent is extended or adjusted under 35 U.S.C. 154(b) by 0 days.

(21) Appl. No.: 09/519,011

(22) Filed: Mar. 3, 2000

(30) Foreign Application Priority Data

Mar. 3, 1999 (DE) .......................................... 299 03 749
Oct. 18, 1999 (DE) .......................................... 299 18 339

(51) Int. Cl.⁷ ................................................. B25G 3/36
(52) U.S. Cl. ........................ 403/403; 403/205; 403/230; 403/13; 52/712
(58) Field of Search ................ 52/712, 715; 248/216.1, 248/216.4, 217.2; 403/13, 14, 230, 233.1, 234, 233, 237, 403, 205

(56) References Cited

U.S. PATENT DOCUMENTS

| | | | | |
|---|---|---|---|---|
| 2,723,815 A | * | 11/1955 | Browning | ................. 248/217.2 |
| 3,423,899 A | | 1/1969 | Demers | |
| 3,633,950 A | | 1/1972 | Gilb | |
| 3,752,512 A | | 8/1973 | Gilb | |
| 4,291,996 A | | 9/1981 | Gilb | |
| 4,480,941 A | | 11/1984 | Gilb | |
| 4,498,801 A | | 2/1985 | Gilb | |
| 4,711,593 A | | 12/1987 | Wilhelmi | |
| 4,965,980 A | * | 10/1990 | Leavens | ...................... 52/712 |
| 5,104,252 A | | 4/1992 | Colonias | |
| 5,380,116 A | | 1/1995 | Colonias | |
| 5,598,680 A | * | 2/1997 | Wilhelmi | ...................... 52/715 |
| 5,603,580 A | | 2/1997 | Leek | |
| 5,896,721 A | * | 4/1999 | Sugiyama | ..................... 52/712 |
| 5,937,609 A | * | 8/1999 | Roth | ............................ 52/712 |
| 5,938,366 A | | 8/1999 | Novacek | |

FOREIGN PATENT DOCUMENTS

| | | |
|---|---|---|
| DE | 36 41 799 | 4/1991 |
| DE | 29610381 U1 | * 10/1996 |
| DE | 199 60185.2 | 12/1999 |

OTHER PUBLICATIONS

Simpson Strong–Tie Co., Inc., Hangers, Wood Construction Connectors Catalog C–2000, Simpson Strong–Tie Co., Inc. (U.S.), p. 49, 56–63, 84, 85, (1999).

Advanced Connectors Systems, Hangers, Connectors for Wood Construction Catalog, Advanced Connector Systems (U.S.A.), p. 19, 20, 22, 23, (copyright date unknown, received 1997).

Hughes Manufacturing, Inc., Hangers, Product Catalog 1997/1998, Hughes Manufacturing, Inc. (U.S.A.), p. 14, 16, 17, 34, (1997).

(List continued on next page.)

*Primary Examiner*—Lynne H. Browne
*Assistant Examiner*—Aaron Dunwoody
(74) *Attorney, Agent, or Firm*—Charles R. Cypher; James R. Cypher

(57) ABSTRACT

A unitary connector made from thin sheet metal is provided that forms a substantially concealed connection between a held member (especially a joist) at the end face thereof to a holding member (especially a header). The connector has a first flange to be applied against the end face of the held member to be connected and a second flange extending away therefrom and which is applied against the holding member, wherein these flanges or fastening flanges can each be provided with fastener openings (generally round), through which fasteners, such as nails, dowel pins, screws or bolts, can be driven into the members to be joined to one another. The second flange is folded over itself to give it strength. A third flange can extend from the second flange over the held member to strengthen the connection.

27 Claims, 7 Drawing Sheets

OTHER PUBLICATIONS

KC Metal Products, Inc., Hangers, KC Metal Superspeed Connectors Catalog, KC Metal Products, Inc. (U.S.A.), p. 6, 7, 10–15, 18–25, 60, (1997).
United Steel Products Company, Hangers, USP Lumber Connectors Full Line Catalog 2000, United Steel Products Company (U.S.A.), p. 13, 54–69, 108–112, 138, 160, 161, (2000).

U.S. Patent application Ser. No. 09/384,512, filed Aug. 27, 1999.

Bulldog–Simpson GmbH, "Übersicht und Vergleich," Janebo Jane–Tu Bozett Pamphlet, Bulldog–Simpson GmbH (Germany), p. 1, (publication date unknown).

* cited by examiner

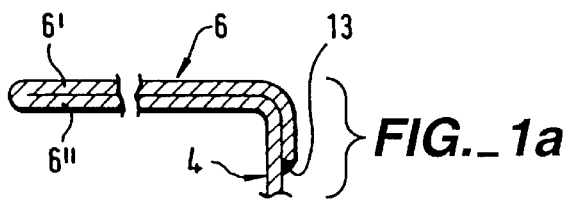
FIG._1a
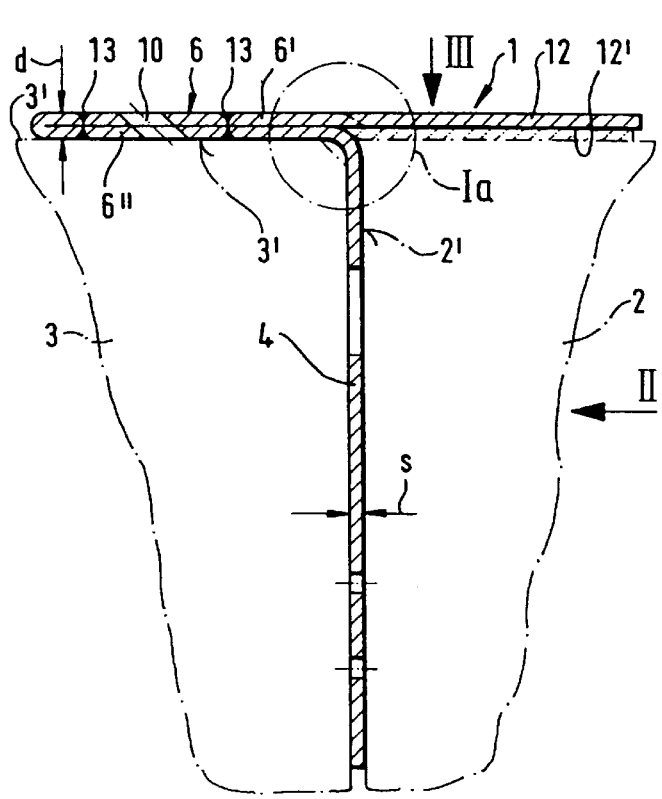
FIG._1
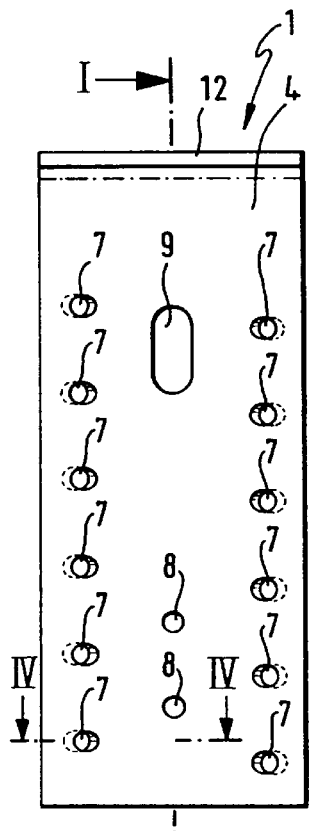
FIG._2
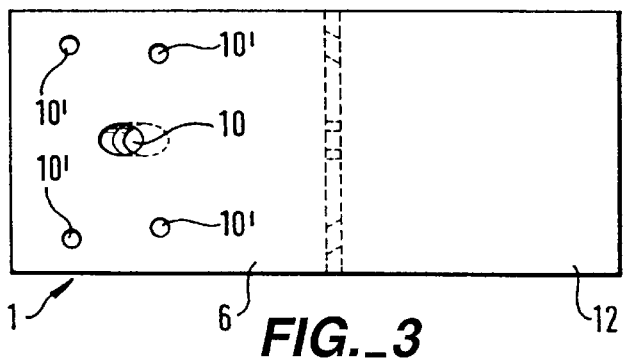
FIG._3
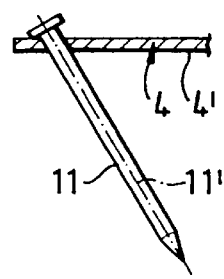
FIG._4

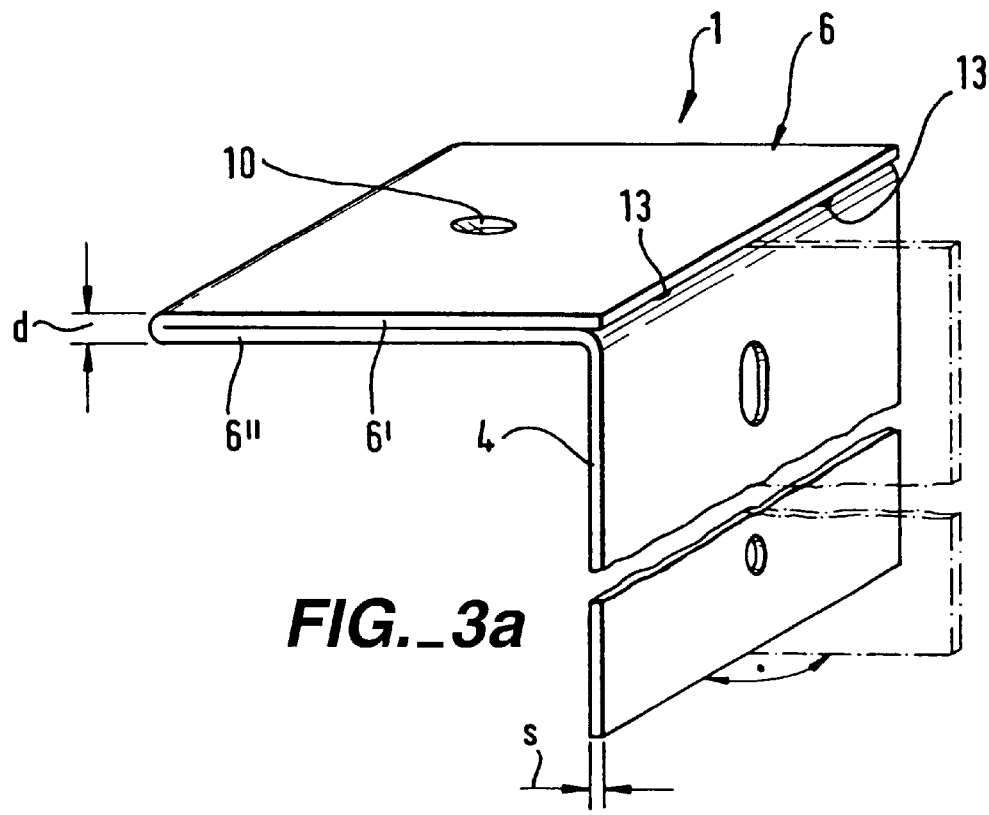
FIG._3a
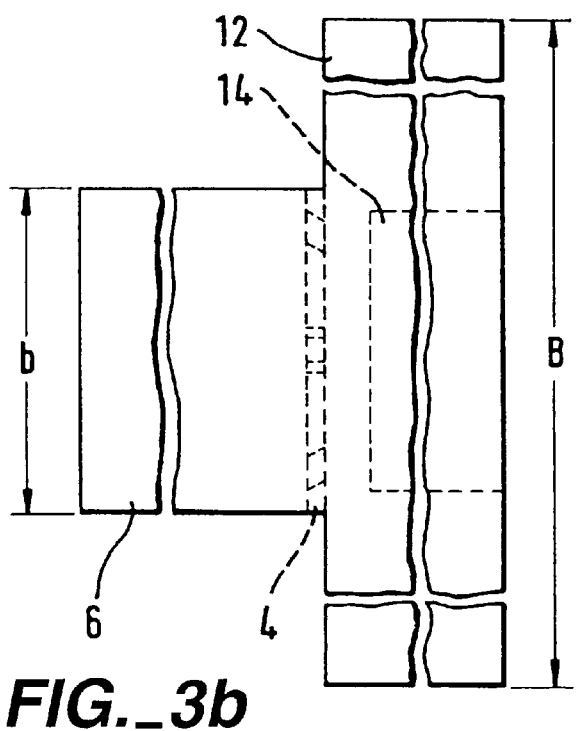
FIG._3b

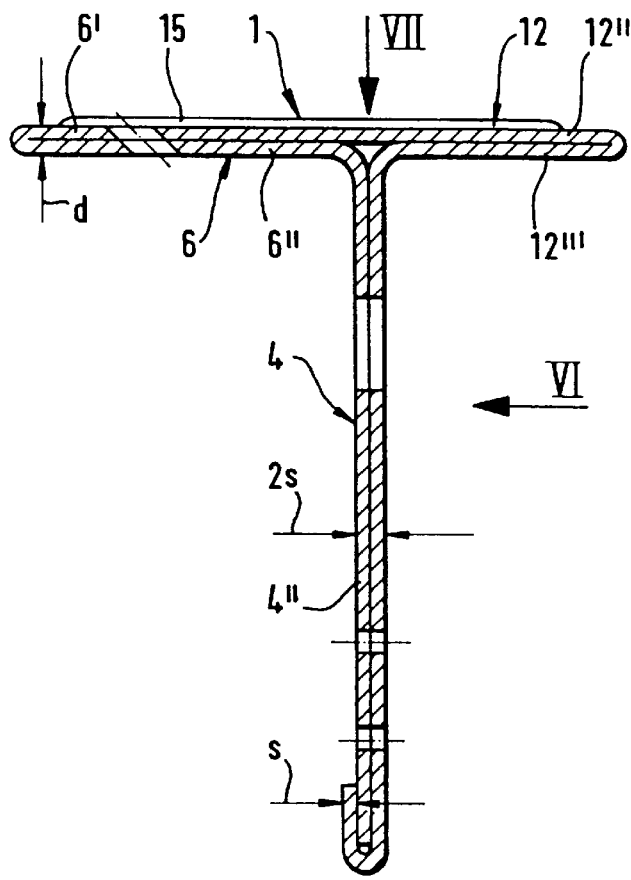
FIG._5
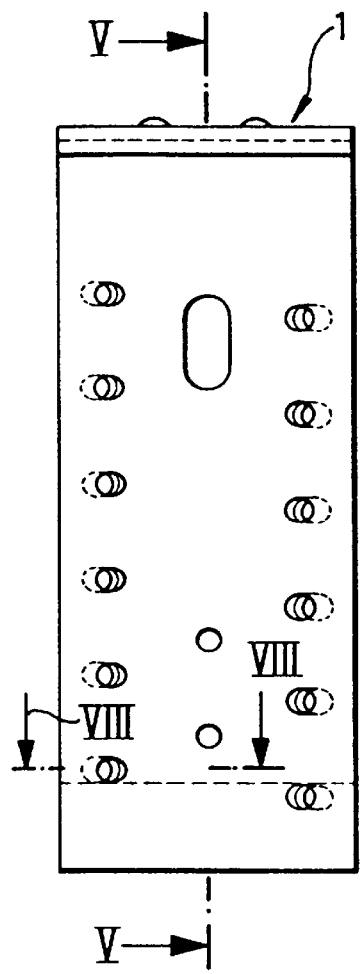
FIG._6
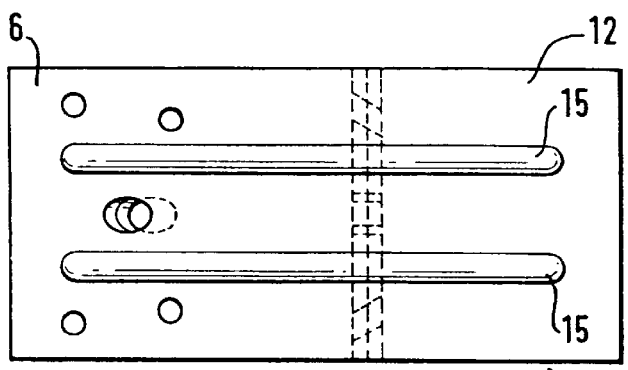
FIG._7
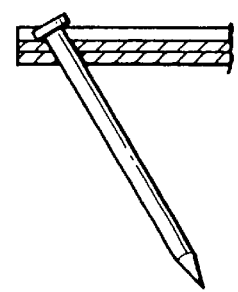
FIG._8

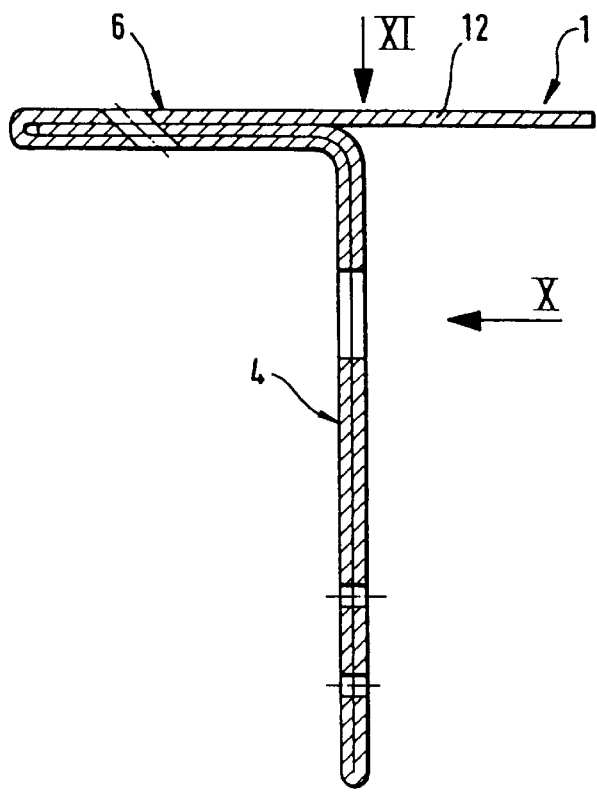
FIG._9
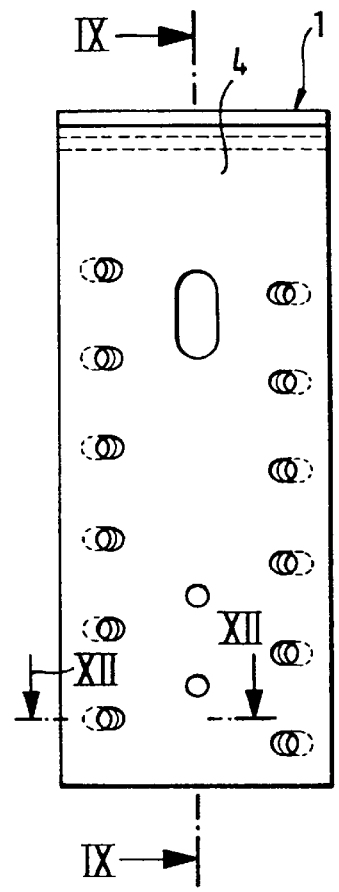
FIG._10
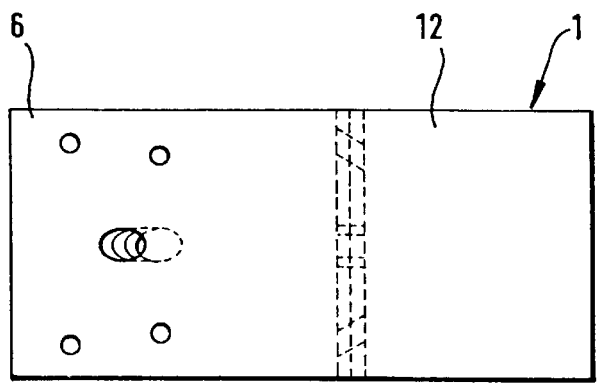
FIG._11
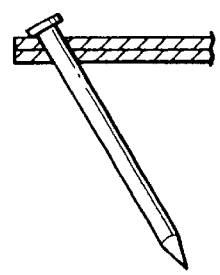
FIG._12

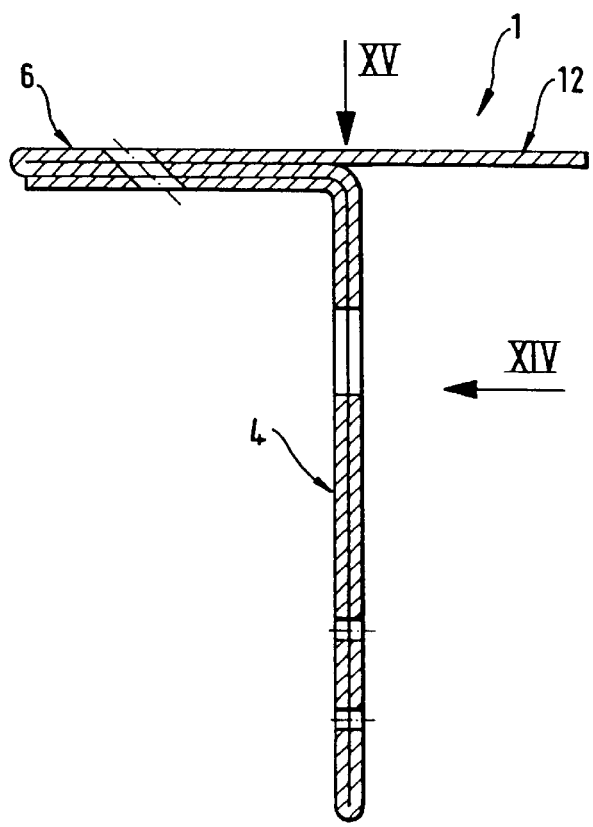
FIG._13
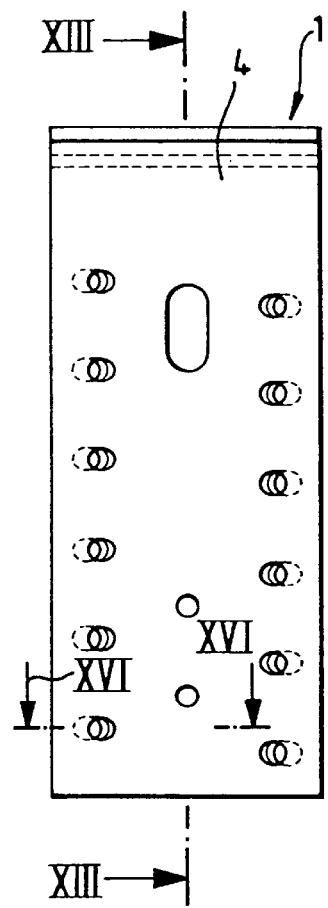
FIG._14
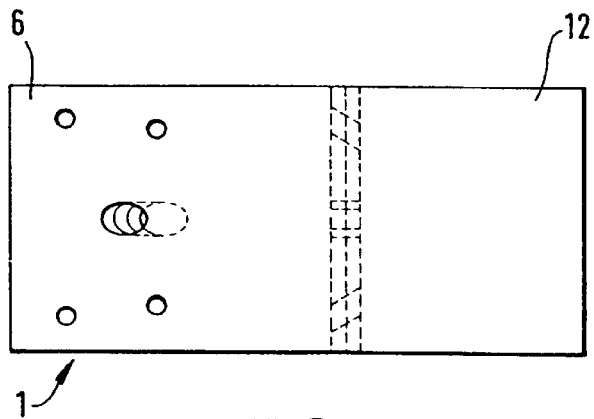
FIG._15
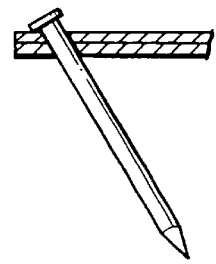
FIG._16

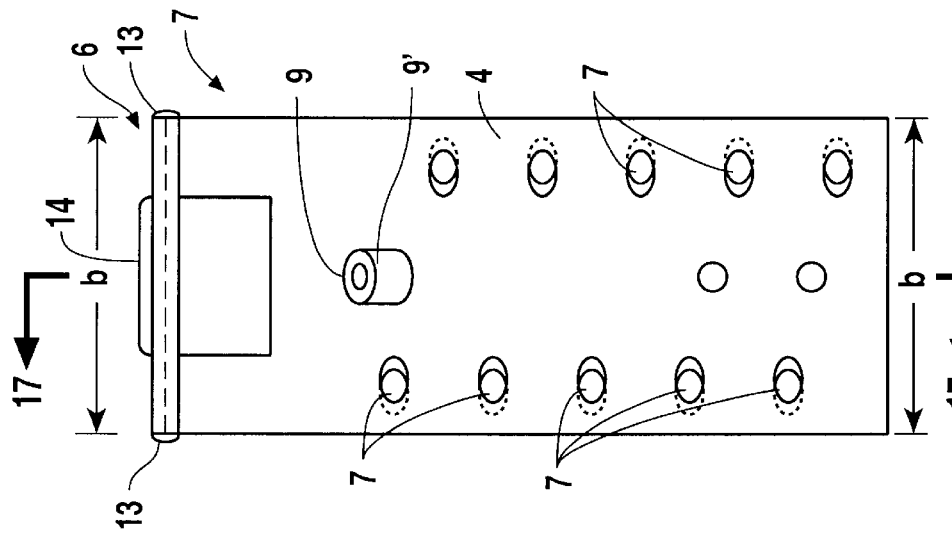
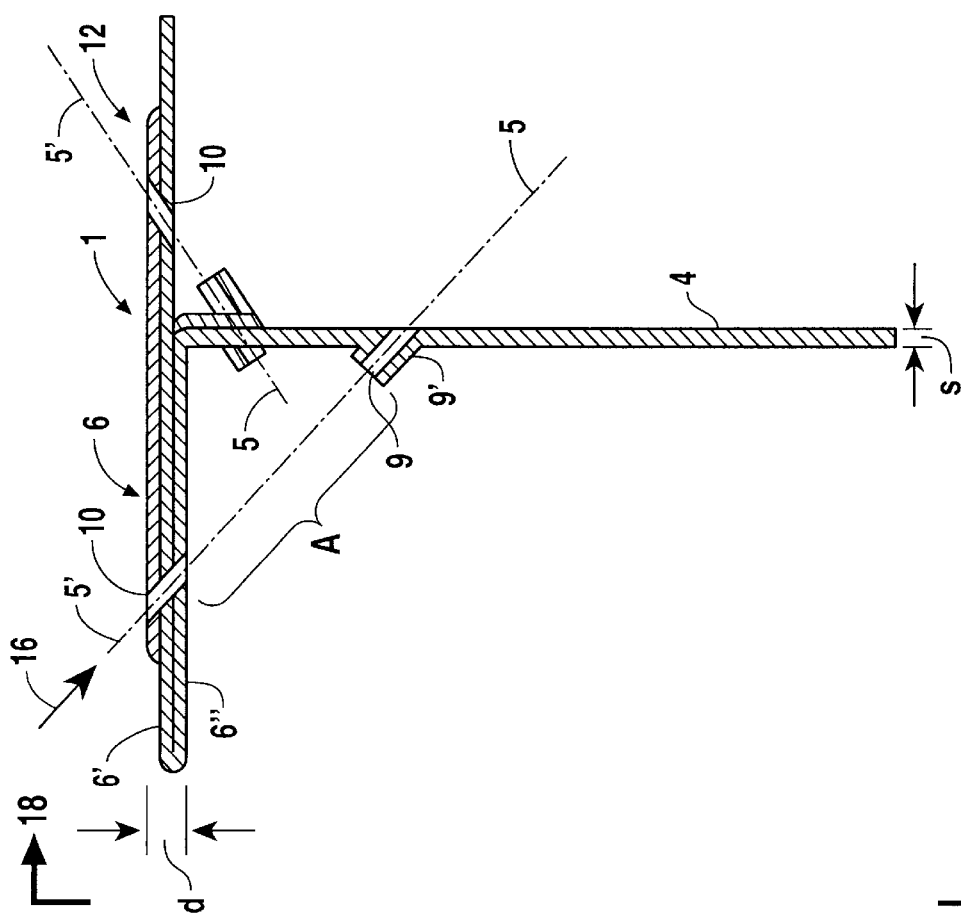

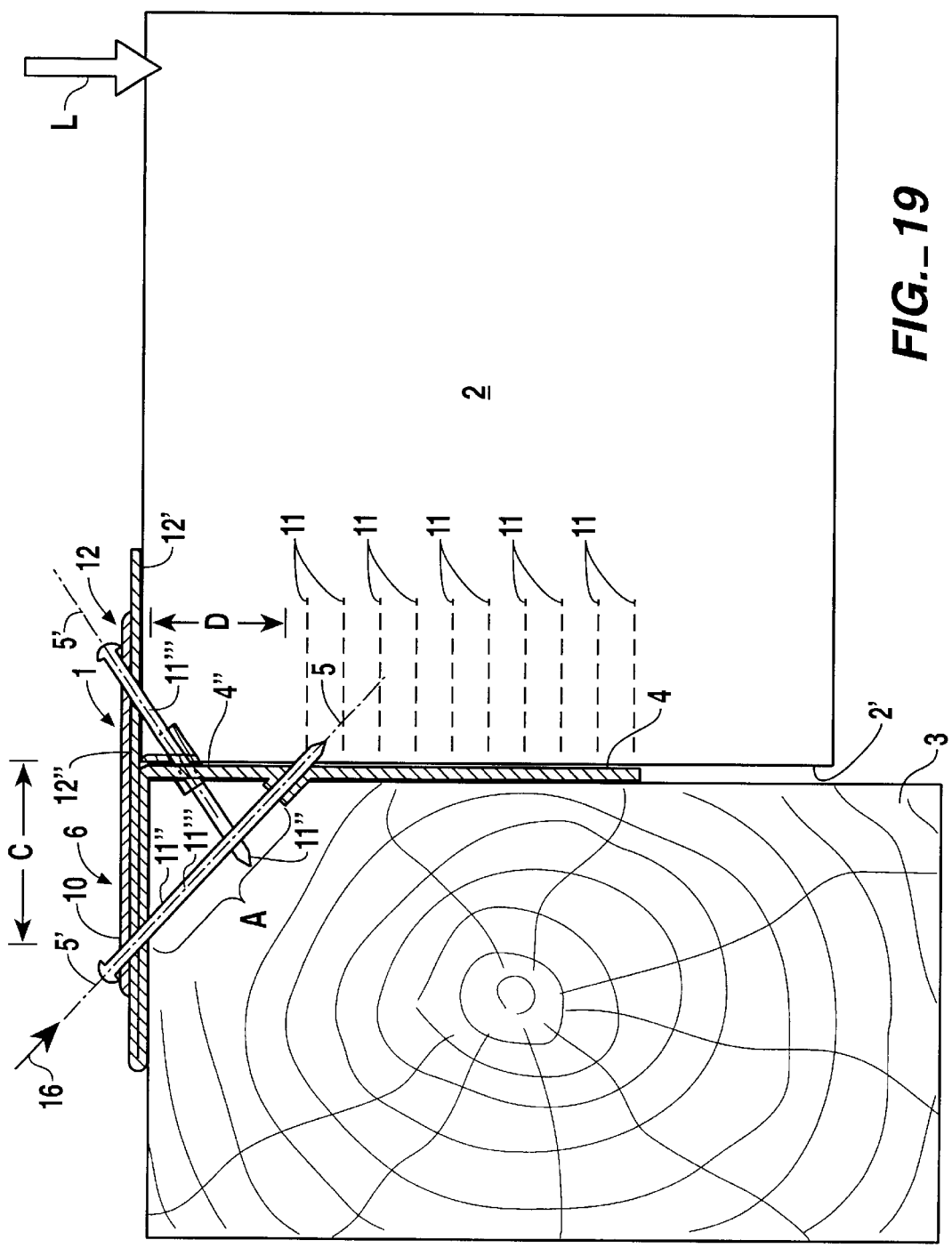
FIG._19

WOOD CONNECTOR OF SHEET METAL

BACKGROUND OF THE INVENTION

The invention relates to a unitary connector, especially of thin sheet metal (preferably at most 4 mm thick per DIN 1052, and more preferably 2 to 3 mm thick depending on strength requirements), especially for substantially concealed connection of a held member (especially a joist) at the end face thereof to a holding member (especially a header), with a first flange to be applied against the end face of the held member to be connected and a second flange extending away therefrom and to be applied against the holding member, wherein these flanges or fastening flanges can each be provided with fastener openings (generally round), through which fasteners, such as nails, dowel pins, screws or bolts, can be driven into the members to be joined to one another.

Such L-shaped connectors are known from German Utility Model DE 29610381.0 U1 for at least substantially concealed connection of a held member at the end face thereof to a holding member. Such connections have proved to be very effective. Since cost and economy considerations provide constant motivation to minimize use of the necessary material, the thinnest possible material thickness that is adequate for the respective strength requirements is also desired for connectors of the cited class, since forming of sheet-metal blanks by folding up edges, bending, etc. becomes easier and thus more cost-effective with decreasing sheet-metal thickness.

It has nevertheless been found that the known connector could be further improved if it could be joined to the held member to be connected not only with its first flange but also with a third flange oriented perpendicular to the first flange and comprising an integral component of the connector, or, in other words, could have a T-shaped cross section, wherein the leg of the T is the first flange, one arm or web the second flange and the other arm or web the third flange. This third flange can also be labeled a tie strap, a connecting flange or a support flange.

In principle, it is certainly not difficult to make T-shaped connectors by cutting them, for example, from extruded sections having appropriate cross-sectional shape. On the other hand, it is obvious that several difficulties will arise in making them from thin sheet metal, since the desired third flange having sufficient strength could indeed be made from relatively thin sheet-metal material, because in installed condition it is subjected substantially only to tensile forces acting in its long direction, but the second flange obviously must have relatively high flexural strength.

An object of the present invention is therefore to improve the known connector of the class described in the introduction as regards the said aspects and—generally expressed— to provide a unitary connector of the cited class, which connector can indeed be made from relatively thin sheet metal (thickness preferably from about 2 to at most about 4 mm), but whose second flange nevertheless has adequate flexural strength to meet the strength requirements.

This object is achieved according to the present invention by the fact that the thickness of the second flange is doubled by folding the edge of the corresponding sheet-metal blank up or over at least one time along the rim of the second flange facing away from the held member to be connected, and thus giving it two-ply structure, as it were.

Although appropriate tests have shown that the aforesaid two-ply or multi-ply structure of portions of the connector which are subjected to relatively large stresses and strains (especially of bending nature) in the installed condition is generally already sufficient, it can be advantageous, in order to increase the resisting torque and thus the strength compared with a single-ply structure of thin sheet metal, if at least one free rim—particularly the rim of the connector adjacent the angle between the first and second flanges—is joined to the portion of the connector disposed there below or/and thereabove, as can be expediently achieved if necessary by welding in particular and, in fact, in particularly simple manner by spot welding wherever possible.

Another embodiment with the same objective is to join to one another—at one place at least—parallel portions of the connector which are in contact with one another, as can also be achieved by welding (along the rims or by means of spot welds) or by adhesive bonding.

In the most preferred embodiment of the connector according to the present invention, at least one ply of the second flange is elongated in the direction of the held member to be connected, beyond the first flange, to form a third flange, which if necessary can engage in an appropriate slot of the held member to be connected, but in general rests expediently on the upper side of the held member to be connected and is fastened there. Since this third flange substantially has only the function of a tie strap, meaning that in installed condition under load it is subjected to stress and strain substantially only by tensile forces oriented in its long direction, it can of course be thinner as a rule than, for example, the second flange, and thus generally has only single-ply structure.

To ensure that the third flange does not have to be hammered or similarly treated for the first time during installation in order to form it such that its underside facing the first flange rests flush on the held member to be connected, the third flange adjacent the first flange can be disposed or formed in a manner offset in the direction of the first flange such that its underside is substantially aligned with the underside of the second flange, as will be further explained hereinafter on the basis of a practical example with reference to FIG. 1 of the drawing as shown in phantom lines.

Preferably, the fastener openings of at least one flange are formed at least partly such that they constitute an oblique forced guide known in the art for the respective fasteners to be driven through; the central axes of the respective fasteners are oriented such that they not perpendicular to the flange in question or its bearing surface, as will also be further illustrated hereinafter with reference to the drawing (see, for example, FIGS. 4, 8 and 12).

To achieve a further increase in flexural strength of the connector or of a portion of the connector, at least one flange can be reinforced by at least one molded crease or the like. For example, it has proved most advantageous if the second flange and/or the third flange is provided with at least one continuous crease facing away from the first flange.

For connectors which are subjected to greater stresses and strains but which, for the already cited reasons, must nevertheless be made from relatively thin sheet metal (preferably about 2 to 4 mm thick), it is also possible for all flanges to have at least two-ply structure if necessary.

In a further preferred embodiment of the present invention, the third flange acting as tie strap has single-ply structure, the first flange to be applied on the one end face of the held member to be connected has two-ply structure and the second flange, which is subjected to considerable bending stresses and strains, has three-ply structure (see, for example, FIGS. 9 to 12 and 13 to 16 of the drawings).

In a further preferred embodiment, the connector according to the present invention is provided, for the purpose of accommodating a rod-like fastener, such as a nail, dowel pin, screw or bolt, in the second flange, at least one first fastener opening, the longitudinal axis of which is aligned with the longitudinal axis of a second fastener opening (meaning that it coincides therewith or is identical thereto) associated with it and formed in the first flange.

In a further preferred embodiment, the connector according to the present invention is provided, for the purpose of accommodating a rod-like fastener, such as a nail, dowel pin, screw or bolt, in the third flange, at least one first fastener opening, the longitudinal axis of which is aligned with the longitudinal axis of a second fastener opening (meaning that it coincides therewith or is identical thereto) associated with it and formed in the first flange.

In the above mentioned first and second fastener openings, each associated in pairs with one another, each is dimensioned and arranged such that, in the finally installed condition of the connector, they bear interlockingly on the fastener they receive, while at the same time the angle formed by the two flanges so joined is endowed with stiffness by means of the rod-like fastener to be driven through them and traversing them after installation, the portion of the fastener extending between the two through openings in the installed condition then forming—in side view—the hypotenuse of a right-angled triangle, which correspondingly stiffens the connector under load against relative bending of its flange and in fact—in an appropriate embodiment—not only against bending but also against relative twisting.

In a preferred embodiment, there are provided in the flanges several—depending on the dimensions of the connector on the one hand and on the dimensions of the members to be joined to one another on the other hand—pairs of first and second fastener openings associated with one another, each for accommodation of one rod-like fastener.

The first and second fastener openings are preferably formed as round holes, since the function assigned thereto can hardly be achieved in general or at least is more difficult to achieve reliably with slots than is the case with holes.

Such an embodiment is advantageous especially if, as in a further preferred embodiment, the rod-like fastener for at least one pair of first and second fastener openings is a screw, wherein at least one fastener opening of the pair of fastener openings in question is provided with a female thread, which corresponds to the male thread of the screw. In a further preferred embodiment, both first and second fastener openings associated with one another can also be formed if necessary as threaded holes, so that the screw to be introduced into them during installation or screwed into them in the finally installed condition is held by thread engagement and therefore interlockingly in both first and second fastener openings.

BRIEF DESCRIPTION OF THE DRAWINGS

FIG. 1 shows a one-piece sheet-metal wood connector according to the invention in cross section, viewed in the direction of section line I—I in FIG. 2. Phantom lines show the second flange offset from the first flange so that it lies flush with the top face of the held member.

FIG. 1a is a cross-sectional view. It shows an alternate arrangement of parts in the angle region between the first and second fastening flange. The area of this detail is circled with a dot-dash line in FIG. 1.

FIG. 2 shows a side view of the wood connector according to FIG. 1 in the direction of arrow 11 in FIG. 1.

FIG. 3 shows a top view of the wood connector according to FIGS. 1 and 2, viewed in the direction of arrow III in FIG. 1.

FIG. 3a shows another version of a wood connector according to the invention (without the third flange or support flange) in perspective.

FIG. 3b shows in a top view, according to FIG. 3, a further version of the connector in which width B of third flange 12 is considerably larger than width b of second flange 6 and of first flange 4.

FIG. 4 shows a section through the wood connector according to FIGS. 1 through 3, viewed in the direction of section line IV—IV in FIG. 2.

FIG. 5 shows a view corresponding to FIG. 1 of another version of the wood connector viewed in the direction of section line V—V in FIG. 6.

FIG. 6 shows a side view of the wood connector according to FIG. 5, viewed in the direction of arrow VI in FIG. 5.

FIG. 7 shows a top view of the wood connector according to FIGS. 5 and 6, viewed in the direction of arrow VII in FIG. 5.

FIG. 8 shows a partial sectional view, corresponding to FIG. 4, of the wood connector according to FIGS. 5 to 7, viewed in the direction of section line VIII—VIII in FIG. 6.

FIG. 9 shows a view, corresponding to FIGS. 1 and 5, of a further version.

FIG. 10 shows a side view of the wood connector according to FIG. 9, viewed in the direction of arrow X in FIG. 9.

FIG. 11 shows a top view of the wood connector according to FIGS. 9 and 10, viewed in the direction of arrow XI in FIG. 9.

FIG. 12 shows a partial sectional view, corresponding to FIGS. 4 and 8, through the wood connector according to FIGS. 9 through 11, viewed in the direction of section line XII—XII in FIG. 10.

FIG. 13 shows a further version corresponding to FIGS. 1, 5 and 9 viewed in the direction of section line XIII—XIII in FIG. 14.

FIG. 14 shows a side view of the wood connector according to FIG. 13, viewed in the direction of arrow XIV in FIG. 13.

FIG. 15 shows a top view of a wood connector according to FIGS. 13 and 14, viewed in the direction of arrow XV in FIG. 13.

FIG. 16 shows a partial sectional view, corresponding to FIGS. 4, 8 and 12, of the wood connector according to FIGS. 13 through 15, viewed in the direction of section line XVI—XVI in FIG. 14.

FIG. 17 shows a cross-section view of a wood connector according to the invention, viewed along section line 17—17 in FIG. 18.

FIG. 18 shows a side view, turned by 90°, of the wood connector according to FIG. 17, viewed in the direction of line 18—18 in FIG. 17, except the upper second opening in the first flange is not shown.

FIG. 19 shows the wood connector according to FIGS. 17 and 18 in finally installed condition.

DESCRIPTION OF THE PREFERRED EMBODIMENT

FIGS. 1 through 3 show a connector 1 comprising thin sheet metal having a wall thickness S of 2 mm for connecting a held member 2 at the end thereof to a holding member 3 disposed crosswise thereto. Connector 1 has a first flange 4 to be disposed against the end face 2' of held member 2 to be connected, and a second flange 6 extending away therefrom and to be disposed against an upper side surface 3' of holding member 3.

The first flange 4 is provided with fastener openings 7 and 8 and second fastener opening 9. Second flange 6 is provided with fastener openings 10' and first fastener opening 10. Fasteners 11 (see FIG. 4) can be driven through the openings to join members 2 and 3. Fastener openings 7 of first flange 4 are formed as round holes oriented obliquely relative to its contact surface 4', which holes are provided with an oblique forced guide for the respective fasteners 11 to be driven in. The central axis 11' (see FIG. 4) of the fastener 11 is oriented such that it is not perpendicular to first flange 4 or its contact surface 4', in order to achieve the advantageous effects desired and achieved in German Utility Model DE 29610381.0 U1 for the connector according to the present invention as well.

As is evident from FIG. 1, thickness d of second flange 6 is doubled by folding the edge of the corresponding sheet-metal blank over along the rim of second flange 6 facing away from the held member 2, thus acquiring a value of 2 S, since the two plies of second flange 6 are in surface contact with one another.

As is further evident from FIGS. 1 and 3 of the drawing, upper ply 6' of second flange 6 is elongated in the direction of the held member 2 to be connected, beyond first flange 4, to a third flange 12. Under these conditions, in a version illustrated with dot-dash lines in FIG. 1, third flange 12 adjacent first flange 4 is offset in the direction of first flange 4 by bending or by folding up its edge such that its underside 12' is aligned with the underside of second flange 6, thus ensuring that underside 12' of third flange 12, acting as a contact surface, is horizontally aligned with the underside of lower ply 6" of second flange 6 and does not have to be hammered into shape for the first time during installation.

FIG. 1a shows detail 1a enclosed with a dot-dash circle in FIG. 1 (in other words the angle region between first and second flanges 4 and 6 respectively as well as third flange 12 if applicable) in a further version of a connector 1 without third flange 12. In this case—and in this respect differing from the embodiment according to FIG. 1—the free end portion of upper ply 6' of second flange 6 is formed such that it is parallel to the angle region between the first and second flanges 4 and 6, so that the resisting torque of second flange 6 is correspondingly increased. In order to improve the strength characteristics still further, the free rim portion of upper ply 6' of second flange 6 oriented parallel to first flange 4 is joined by a spot weld 13 to first flange 4.

It must be pointed out here that the two mutually parallel, mutually contacting plies 6' and 6" of second flange 6 can also be joined permanently to one another by spot weld 13 or adhesive bonding.

FIG. 3a shows an embodiment which resembles the connector according to FIGS. 1 through 3, which also comprises a thin steel sheet of 2 mm thickness, but which is not provided with a third flange 12, wherein here again the thickness of first flange 4 is 2 mm and thickness d of second flange is twice as large, or in other words is 4 mm. In this embodiment also the free rim of upper ply 6' of second flange 6 facing first flange 4 is joined by spot weld 13 to lower ply 6" of the second flange or to first flange 4.

FIG. 3a also shows a further version (illustrated with dot-dash lines) in which the one half of the first flange is swung up by 90° relative to the other half, and during installation is guided into a corresponding slot of held member 2 and held there with dowel pins.

FIG. 3b shows (only) in a top view according to FIG. 3 a further version in which width B of third flange 12 is considerably larger than width b of second flange 6 and of first flange 4. In this case third flange 12 can form a right-angled surface, as in the embodiment according to FIGS. 1 to 3 (see FIG. 3). If necessary, however, it can also be recessed, especially in its middle region 14, as is indicated by dotted lines in FIG. 3b.

FIGS. 5 through 8 show another version of a connector 1, wherein the diagram according to FIG. 5 corresponds to FIG. 1, that of FIG. 6 to FIG. 2 and that of FIG. 7 to FIG. 3.

The connector according to FIGS. 5 through 8 differs from the version described in the foregoing substantially in that all surface portions have two-ply structure and in that the second flange 6 and the third flange 12 are aligned with one another are provided with two creases 15, which are stamped in such a way in upper plies 6' and 12" respectively of third flange 12 that they protrude upwardly, so that the two plies 6' and 6" or 12" and 12'" can nevertheless be in contact with one another. As regards the embodiment of connector 1 according to FIGS. 5 through 8 depicted in the foregoing, the corresponding sheet-metal blank—as in connector 1 according to FIGS. 1 through 4—ends at the lower rim of first flange 4 at its ply 4" facing holding member 3, but at its other rim does not end at the free end of third flange 12, which in this embodiment also has two-ply structure. Instead, the second free rim is also disposed at the lower end portion of first flange 4, albeit not beside the free rim of ply 4" in the embodiment illustrated in FIG. 5, since the second ply of first flange 4 is bent one additional time around the free rim of ply 4", so that the first flange has three-ply structure at its lower end portion.

FIGS. 9 through 12 show a further version of a connector 1 according to the present invention, wherein parts or portions which are similar or have similar action or correspond to one another once again have the same reference symbols as in the embodiment according to FIGS. 1 to 4.

In connector 1 according to FIGS. 9 through 11, it is obvious that third flange 12 has one-ply, first flange 4 two-ply and second flange 6 three-ply structure, wherein the rim of second flange 6 facing away from third flange 12 is rounded off as in the embodiments described hereinabove, since the third ply of second flange 6 extends into the upper and lower plies.

The version according to FIGS. 13 through 16 differs from this embodiment substantially only (see in particular FIG. 13 in comparison with FIG. 9) in that the two upper plies of the second flange are rounded off by appropriately folding the edges over, and in that thereunder there is disposed the third ply of second flange 6, which ends in truncated form at the rim of second flange 6 facing away from third flange 12.

FIGS. 17, 18 and 19 show a connector 1 of sheet metal, having a thickness S of 3 mm. In some places, the connector 1 shown in FIGS. 17, 18 and 19 is shaped or machined (by chip-removing methods if necessary) in a certain way.

In the version according to FIGS. 17, 18 and 19, first flange 4 is provided with three mutually parallel rows of fastener openings 7 and 8, the longitudinal axis of which is disposed obliquely relative to the plane of first flange 4 (as far as outer fastener openings 7 adjacent the rim are concerned), so that fasteners 11, which are to be driven through outer fastener openings 7 during assembly, and which in FIG. 19 are indicated merely by dashed lines, are oriented correspondingly obliquely relative to end face 2' of held member 2 or to the plane of first flange 4 when in installed condition.

In contrast, the two fastener openings 8 in first flange 4 are formed therein in such a way that their longitudinal axes are oriented perpendicular to the plane of first flange 4.

In addition, first flange 4 is also provided in its upper portion with (at least) one second fastener opening 9, which is obtained by appropriate shaping of first flange 4 and which is formed by an appropriately shaped projection 9', which is obtained by a type of deep-drawing process. As can be seen in particular from FIGS. 17 and 19, the longitudinal central line 5 of this second fastener opening 9 is also oriented obliquely relative to the plane of first flange 4 and thus—in the installed condition—relative to connection end face 2' of held member 2 as well. It is aligned with longitudinal central line 5' of a first fastener opening 10 adjacent the free end portion of second flange 6 and formed therein. As shown in FIG. 17, a second fastener opening 9 can also be aligned with longitudinal central line 5' of a first fastener opening 10 adjacent the free end portion of third flange 12 and formed therein.

Second and first fastener openings 9 and 10 associated with one another are used to accommodate a fastener 11", which has a longitudinal axis 11''', (preferably a nail or screw), which during installation is driven or screwed in obliquely from above in the direction of arrow 16, after connector 1 has first been fixed to held member 2 by proper placement with fasteners 11, which are driven in via through fastener openings 7 and 8, and held member 2 has been braced and placed properly at the intended position by lowering second flange 6 onto upper side 3' of holding member 3. For this purpose the second and first fastener openings 9 and 10 associated with one another as a pair are dimensioned and arranged such that, in the installed condition, they bear interlockingly on fastener 11", while at the same time the "angle element" formed by the first and second flanges 4 and 6 is endowed with stiffness by means of the said fastener 11" driven through them and traversing them after installation, the portion A of the said fastener extending between the second and first fastener openings 9 and 10 in the installed condition then forming, in the side view according to FIGS. 17 and 19, the hypotenuse of a right-angled triangle with legs C and D, which triangle correspondingly stiffens connector 1 under load L (see arrow in FIG. 3) against relative bending and/or twisting of its first and second flanges 4 and 6.

This stiffening effect, which is the main objective of the connector of the present invention, can obviously be further enhanced if there are provided in first and second flanges 4 and 6 of connector 1 several pairs of second and first fastener openings 9 and 10 associated with one another, each for accommodation of one rod-like fastener 11" (preferably a nail or screw) and, in another embodiment, which obviously can also be additionally provided, by the fact that there is chosen as the rod-like fastener not a nail 11" but in each case a screw, wherein at least one fastener opening 9 and/or 10 is then provided with an appropriate female thread, which corresponds to the male thread of the screw, so that this—if necessary after a pilot hole has first been formed—can be screwed in obliquely from above in the direction of arrow 16, and wherein the stiffening effect can be enhanced still further if necessary by forming both second and first fastener openings 9 and 10 of a pair of fastener openings associated with one another as threaded holes if necessary.

Given this information, it is immediately obvious to the person skilled in the art that a corresponding feature can also be provided (separately or additionally) if necessary with regard to third flange 12. In other words, this can also be provided if necessary with a first fastener opening 10, which is oriented obliquely relative to the flange plane and the longitudinal central axis 5' of which is aligned with a further second fastener opening 9 in the first flange 4, which further second fastener opening 9 is also formed by appropriate shaping of a projection 9', albeit obviously in mirror-image relationship, as it were, relative to the plane of first flange 4, whereby there can obviously be achieved further considerable stiffening of connector 1

It is immediately obvious that, within the scope of the present invention, still further diverse embodiments are possible without leaving the scope of the invention, and that the embodiments illustrated in the drawing therefore represent merely examples intended to contribute to explanation of the present invention.

I claim:
1. A connection comprising:
   a. a held member, having an end face;
   b. a holding member, having an upper side surface; and
   c. a unitary connector, connecting said held member to said holding member to create a substantially concealed connection of said held member at the end face thereof to said holding member, said unitary connector having,
      1. a first flange to be applied against said end face of said held member, and
      2. a second flange extending away therefrom and to be applied against said upper side surface of said holding member, wherein said second flange has a thickness and the thickness of said second flange is at least doubled by folding said second flange over itself, forming a plurality of plies.
2. The connection of claim 1, wherein:
said first and second flanges are each provided with fastener openings through which fasteners can be driven into said held and holding members to be joined to one another.
3. The connection of claim 1, wherein:
   a. said connector is formed from a sheet metal blank, having at least one edge;
   b. said second flange when it is folded over itself has at least one rim; and
   c. the thickness of said second flange is at least doubled by folding said edge of the corresponding sheet-metal blank up at least one time along the rim of the second flange facing away from the held member to be connected.
4. The connection of claim 1, wherein:
   a. said first and second flanges form an angle between them;
   b. said connector has a free rim adjacent said angle between said first and second flanges of the connector; and
   b. said free rim is welded to said connector immediately adjacent said free rim.
5. The connection of claim 1, wherein:
said connector is characterized in that said second flange has an upper ply and a lower ply and said upper ply of said second flange and said lower ply of said second flange are in contact and are joined by a spot weld.
6. The connection of claim 1, wherein
   a. there is provided a fastener;
   b. there is provided, for the purpose of accommodating said fastener in said first flange, at least one first fastener opening, having a longitudinal axis, and
   c. there is provided, for the purpose of accommodating said fastener in said second flange, at least one second fastener opening, having a longitudinal axis, and wherein, d. said longitudinal axes of said second and first fastener openings being aligned and dimensioned and arranged such that, in the finally installed condition of said connector and said held and holding members, said first and second fastener openings bear interlockingly on said fastener received by them, which correspondingly stiffens said connector.

7. The connection of claim 1, wherein:

a. there is provided a fastener;

b. there is provided, for the purpose of accommodating said fastener in said first flange, at least one second fastener opening, having a longitudinal axis; and c. there is provided a third flange and, for the purpose of accommodating said fastener in said third flange, at least one first fastener opening, having a longitudinal axis, and wherein;

d. said longitudinal axes of said second and first fastener openings being aligned and dimensioned and arranged such that, in the finally installed condition of said connector and said held and holding members, said first and second fastener openings bear interlockingly on said fastener received by them, which correspondingly stiffens said connector.

8. The connection of claim 6, wherein:

said fastener is a screw with a male thread; and at least one of said first or second fastener openings is provided with a female thread, which corresponds to the male thread of said rod-like fastener.

9. The connection of claim 7, wherein:

said fastener is a screw with a male thread; and at least one of said first or second fastener openings is provided with a female thread, which corresponds to the male thread of said rod-like fastener.

10. The connection of claim 6, wherein:

both said first and second fastener openings are threaded.

11. The connection of claim 7, wherein:

both said first and second fastener openings are threaded.

12. The connection of claim 6, wherein:

at least one of said first or second fastener openings is formed with a substantially cylindrically or frustoconically shaped portion which surrounds the corresponding first or second fastener opening substantially concentrically.

13. The connection of claim 7, wherein:

at least one of said first or second fastener openings is formed with a substantially cylindrically or frustoconically shaped portion which surrounds the corresponding first or second fastener opening substantially concentrically.

14. The connection of claim 1, wherein:

at least one ply of said second flange is elongated towards said held member to be connected beyond said first flange to form a third flange.

15. The connection of claim 14, wherein:

a. said second and third flanges of said connector have undersides; and b. said third flange adjacent said first flange is offset towards said first flange such that its underside is substantially aligned with said underside of said second flange.

16. The connection of claim 14, wherein:

an opening for a fastener, said fastener having a central axis, is formed in one of said flanges of said connector, and said opening is formed at least partly such that it constitutes an oblique forced guide for the respective fastener to be driven therethrough, such that the central axis of said fastener is oriented such that it is not perpendicular to the flange that receives it.

17. The connection of claim 14, wherein:

at least one of said second and third flanges is reinforced by at least one molded crease in order to increase its resisting torque.

18. The connection of claim 14, wherein:

at least one of said second and third flanges is provided with at least one continuous crease facing away from said first flange.

19. The connection of claim 14, wherein:

said first, second and third flanges of said connector have at least two-ply structure.

20. The connection of claim 14, wherein:

said third flange has single-ply structure, said first flange has two-ply structure and said second flange has three-ply structure.

21. The connection of claim 14, wherein:

said third flange is formed with a width B, and said second flanges is formed with a width b, and said width B of said third flange is larger than the width b of said second flange.

22. The connection of claim 14, wherein:

said third flange has a free end potion near which it is recessed.

23. The connection of claim 14, wherein:

said first flange comprises two portions oriented perpendicular to one another.

24. A unitary connector for connecting a held member to a holding member to create a substantially concealed connection of said held member at an end face thereof to said holding member, said unitary connector being made of sheet metal, and comprising:

a. a first flange adapted to be applied against said end face of said held member; and b. a second flange extending away therefrom and adapted to be applied against said holding member, wherein said second flange has a thickness and the thickness of said second flange is at least doubled by folding said second flange over itself, forming a plurality of plies.

25. The connection of claim 1, wherein:

said connector is characterized in that said second flange has an upper ply and a lower ply and said upper ply of said second flange and said lower ply of said second flange are in contact and are joined by an adhesive bond.

26. The connection of claim 1, wherein:

said connector is characterized in that said second flange has an upper ply and a lower ply and said upper ply of said second flange and said first flange are in contact and are joined by a spot weld.

27. The connection of claim 1, wherein:

said connector is characterized in that said second flange has an upper ply and a lower ply and said upper ply of said second flange and said first flange are in contact and are joined by an adhesive bond.

* * * * *

UNITED STATES PATENT AND TRADEMARK OFFICE
CERTIFICATE OF CORRECTION

PATENT NO. : 6,698,971 B1
DATED : March 2, 2004
INVENTOR(S) : Wilhelm

It is certified that error appears in the above-identified patent and that said Letters Patent is hereby corrected as shown below:

Title page,
Item [56], References Cited, U.S. PATENT DOCUMENTS, add the following references:
-- 6,474,902   11-2002       Beauvoir
   6,408,589   6-2002        Bousquet --
FOREIGN PATENT DOCUMENTS, add the following:
-- DE 3130445 C2
   EP 0937832 A2 --
OTHER PUBLICATIONS, add the following:
-- BULLDOG BERATUNGS-UND VERTRIEBS-GMBH, "Statische Berechnungen, Teil 2, "Bulldog Bausysteme Fur Holz, Bulldog Beratungs-und Vertriebs-GmbH (Germany), consisting of 16 pages, (January 1993).

Title-Neben Haupt Trager Verbinder; Publisher-NHT Holzleimbauprodukte H. Bohremkamper; Address-Pestalizzistrasse 16, 32257, Bunche, Germany; Published at least as early as 4-29-1999; 4 pages Title-Practical Diploma Studies; Publisher Quadriga; Address-Schlosshof 2-6, 85283 Wolhzach, Germany; Published January 1997; 2 pages.

Title-SFS WT-System Von Merk Brochure; Publisher-Merk Bauprodukte, Merk GmbH; Address-Industriestrasse 2, D 86551, Aichach, Germany; Published at least as early as 10-22-2002; 2 pages --

Column 3,
Lines 60-61, replace "direction of section line I-I in
                    FIG. 2 Phantom lines shown the second flange offset from" with
-- direction of section line I-I in FIG. 2 Phantom lines show the second flange offset from --.

Column 4,
Line 2, replace "arrow 11 in" with -- arrow II in --.

UNITED STATES PATENT AND TRADEMARK OFFICE
CERTIFICATE OF CORRECTION

PATENT NO.    : 6,698,971 B1
DATED         : March 2, 2004
INVENTOR(S)   : Wilhelm It is certified that error appears in the above-identified patent and that said Letters Patent is hereby corrected as shown below:

Column 9,
Lines 31 and 36, replace "of said rod-like fastener" with -- of said fastener --.

Signed and Sealed this

Twenty-sixth Day of October, 2004

JON W. DUDAS
*Director of the United States Patent and Trademark Office*